United States Patent
D'Amato et al.

(10) Patent No.: US 11,629,694 B2
(45) Date of Patent: Apr. 18, 2023

(54) WIND TURBINE MODEL BASED CONTROL AND ESTIMATION WITH ACCURATE ONLINE MODELS

(71) Applicant: GENERAL ELECTRIC COMPANY, Schenectady, NY (US)

(72) Inventors: Fernando Javier D'Amato, Niskayuna, NY (US); Fabiano Daher Adegas, São Paulo (BR); Justin Barton, Glenville, NY (US); Alexander Luenenschloss, Hamburg (DE)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 16/660,084

(22) Filed: Oct. 22, 2019

(65) Prior Publication Data
US 2021/0115895 A1    Apr. 22, 2021

(51) Int. Cl.
  *F03D 7/00*      (2006.01)
  *F03D 17/00*     (2016.01)
  *G05B 17/02*     (2006.01)

(52) U.S. Cl.
  CPC .............. *F03D 7/00* (2013.01); *F03D 17/00* (2016.05); *G05B 17/02* (2013.01)

(58) Field of Classification Search
  CPC ............ F03D 7/00; F03D 17/00; F03D 7/045; F03D 7/02; F03D 7/0224; F03D 7/04;
  (Continued)

(56) References Cited

U.S. PATENT DOCUMENTS 9,217,416 B2   12/2015   Spruce et al.
9,261,077 B2    2/2016   Tirumalai et al.
(Continued)

FOREIGN PATENT DOCUMENTS

CN   102592026 A      7/2012
CN   102459877 A  *   8/2016   ........... F03D 7/0224
(Continued)

OTHER PUBLICATIONS

U.S. Patent Application Publication 2018/0017039, Jan. 2018see short version.*
(Continued)

*Primary Examiner* — Kandasamy Thangavelu
(74) *Attorney, Agent, or Firm* — Dority & Manning, P.A.

(57) ABSTRACT

A system for computing wind turbine estimated operational parameters and/or control commands, includes sensors monitoring the wind turbine, a control processor implementing a model performing a linearization evaluation to obtain a structural component dynamic behavior, a fluid component dynamic behavior, and/or a combined structural and fluid component dynamic behavior of wind turbine operation, and a module performing a calculation utilizing the linearization evaluation of the structural component dynamic behavior, the fluid component dynamic behavior, and/or the combined structural and fluid component dynamic behavior. The module being at least one of an estimation module and a multivariable control module. The estimation module generating signal estimates of turbine or fluid states. The multivariable control module determining actuator commands that include wind turbine commands that maintain operation of the wind turbine at a predetermined setting in real time. A method and a non-transitory medium are also disclosed.

25 Claims, 3 Drawing Sheets

(58) Field of Classification Search
CPC ......... F03D 7/048; F03D 13/30; G05B 17/02; G05B 15/02; F05B 2260/84; F05B 2270/404; F05B 2270/30; F05B 2270/324; F05B 2270/328; F05B 2270/329; F05B 2270/702; Y02E 10/72; E21B 43/2406; G01M 7/00; G01S 17/58; H02J 3/386; H04L 69/28

See application file for complete search history.

(56) References Cited

U.S. PATENT DOCUMENTS

| | | | |
|---|---|---|---|
| 9,945,264 | B2 | 4/2018 | Wichmann et al. |
| 2013/0302161 | A1 | 11/2013 | Koerber et al. |
| 2015/0369214 | A1 | 12/2015 | Herbsleb et al. |
| 2016/0160842 | A1 | 6/2016 | Munoz |
| 2018/0017039 | A1* | 1/2018 | Davoust .................. G01S 17/58 |
| 2018/0087357 | A1* | 3/2018 | Conn .................. E21B 43/2406 |
| 2018/0137277 | A1* | 5/2018 | Mestha ............... G05B 23/0227 |
| 2018/0159879 | A1* | 6/2018 | Mestha ................. G06N 3/0454 |

FOREIGN PATENT DOCUMENTS

| | | | | | |
|---|---|---|---|---|---|
| CN | 107532568 | A | * | 1/2018 | ............. G05B 15/02 |
| CN | 108694277 | A | * | 10/2018 | ............. F03D 13/30 |
| EP | 1 907 695 | A1 | | 4/2008 | |
| EP | 1911968 | A1 | | 4/2008 | |
| EP | 3276164 | A2 | * | 1/2018 | ............. G05B 15/02 |
| EP | 3536948 | A | * | 9/2019 | ............. F03D 7/048 |
| JP | 2015527857 | A | * | 9/2015 | ............. H02J 3/386 |
| JP | 6510959 | B2 | * | 5/2019 | ............. Y02E 10/72 |
| KR | 20180048770 | A | * | 5/2018 | ............. H04L 69/28 |
| KR | 2018 0119960 | A | | 11/2018 | |
| WO | WO 2007/010322 | A1 | | 1/2007 | |
| WO | WO 2012/130237 | A1 | * | 10/2012 | ............. G01M 7/00 |
| WO | WO 2017/158479 | A1 | * | 9/2017 | ............. F03D 7/02 |
| WO | 2017167344 | A1 | | 10/2017 | |
| WO | WO 2017/167343 | A1 | * | 10/2017 | ............. F02D 7/04 |
| WO | 2018073688 | A1 | | 4/2018 | |

OTHER PUBLICATIONS

U.S. Patent Application Publication 2018/0087357 A1, Mar. 2018, see the short version.*
A.G.Abo-Khalil et al., "MPPT Control of Wind Generation Systems Based on Estimated Wind Speed Using SVR", IEEE Transactions on Industrial Electronics, vol. 55, Issue: 3, pp. 1489-1490, Mar. 2008.
W.Qiao et al., "Wind Speed Estimation Based Sensor less Output Maximization Control for a Wind Turbine Driving a DFIG", IEEE Transactions on Power Electronics, vol. 23, Issue: 3, pp. 1156-1169, May 2008.
EPO Search Report, dated Mar. 19, 2021.
EPO Communication pursuant to Article 94(3) for EP application No. 20203106.8, dated Jun. 22, 2022.

* cited by examiner

WIND TURBINE MODEL BASED CONTROL AND ESTIMATION WITH ACCURATE ONLINE MODELS

BACKGROUND

Models of wind turbines and surrounding aerodynamics are used for estimation and control applications to capture the physical behavior of the turbine for online calculation. In some conventional estimation applications, the model can be used to provide an approximation of parameter magnitudes that are not directly measured. For example, a wind turbine model-based estimator can provide the blade tip deflection, even though no tip deflection sensor is used. In some conventional control applications, a wind-turbine model can provide the control system with calculated estimates of tower base moments, blade root moments, etc. as input from which the control system can find an appropriate set of commands to adjust the blade pitch angle and the generator torque to ensure that the blade root and tower base moments do not exceed their allowed limits.

Models of wind turbines can also be used in off-line high-fidelity simulations, for example, as required in detailed structural loads analyses. These models typically include many degrees of freedom to improve the predictive accuracy of transient behavior. Typical turbine degrees of freedom modeled in wind turbine simulation environments include drive-train rotation, drive-train torsion, first few bending modes of the tower in the fore-aft and side-to-side directions, first few torsional modes of the tower, first few bending modes of the blades in the flap and edge directions, first torsional modes of the blades, tower foundation translation and rotation modes, and nacelle nodding mode.

One key difference between models used for simulation and those used for estimation or control is that the latter require the calculation of linear approximations or derivatives, which are expensive to compute, while the simulation models only need to evaluate the equations. Models used for control and estimation application will be referred to as "control models".

Due to the limited computational capabilities provided in conventional industrial control platforms, the fidelity that characterize simulation models is difficult to achieve in control models that operate in real time. To capture the most essential wind turbine operational features in a limited computational environment, conventional first-generation control models use simplified models of the turbine structural dynamics and aerodynamics. Typical elements of these conventional online models are characterized by a simplified quasi steady aerodynamics model in the form of lookup tables obtained from blade element momentum ("BEM") theory adopting numerous assumptions—for example, modeling only the first tower bending modes in the fore-aft and side-by-side directions, and assuming that the aerodynamic forces develop instantaneously in response to any changes in the wind field or in structural displacements.

These typical wind turbine online models can include elements such as, for example, drive-train rotation [Equations (1)-(2)]; first bending mode of the tower in the fore-aft direction [Equations (3)-(4)]; first bending mode of the tower in the side-to-side direction [Equations (5)-(6)]; and static aerodynamic tables for power, torque and thrust [Equations (7)-(8)]. These conventional models can have the following forms:

$$\frac{d\phi_r}{dt} = \omega_r \quad (1)$$

$$\frac{d\omega_r}{dt} = \frac{1}{J}(M_a - N_g T_{gen}) \quad (2)$$

$$\frac{dx_{fa}}{dt} = v_{fa} \quad (3)$$

$$\frac{dv_{fa}}{dt} = -2\zeta_{fa}\omega_{fa}v_{fa} - \omega_{fa}^2 x_{fa} + K_1 F_a \quad (4)$$

$$\frac{dx_{ss}}{dt} = v_{ss} \quad (5)$$

$$\frac{dv_{ss}}{dt} = -2\zeta_{ss}\omega_{ss}v_{ss} - \omega_{ss}^2 x_{ss} + K_2 T_{gen} \quad (6)$$

$$M_a = \frac{1}{2}\rho V_{eff}^2 \pi R^3 C_m(\theta, \lambda) \quad (7)$$

$$F_a = \frac{1}{2}\rho V_{eff}^2 \pi R^2 C_t(\theta, \lambda) \quad (8)$$

Where $\theta$ is the blade pitch angle, $V_{eff}=V_w-v_{fa}$ is the effective wind speed at the tower top, $\lambda=\omega R/V_{eff}$ is the blade tip to wind speed ratio; $T_{gen}$ is the generator torque control input; and $N_g$ is the gearbox ratio. The advantage of model (1-8) is that its derivatives are simple to calculate. However, controllers that use this type of control models may have limited performance because of their inaccuracy.

To achieve higher energy production and superior load-mitigation capabilities, advances in the design and operation criteria for wind turbine power generation stations are needed. Operational advances can be obtained by improving the control system design and the turbine structure and aerodynamic models.

What is missing from the art are control models having a higher fidelity than conventional models to provide improved control system design and the turbine structure and aerodynamic modeling. These higher fidelity models will still need to operate on the limited computational power available at a wind power generation platform but provide a rigorous physical representation of the turbine and aerodynamics.

DESCRIPTION

Embodying systems and methods provide a wind turbine high fidelity control model that provide a rigorous physical representation of the turbine structural dynamics and aerodynamics while operating on the limited computational power available at a wind power generation platform.

Prior attempts to improve conventional modeling are hindered by modeling errors originating from a set of simplifying assumptions—including, but not limited to, representing tower bending using just the first bending mode, ignoring tower torsion, ignoring blade flexibility, representing deterministic wind as the mean wind speed only, ignoring dynamic wake effects, and assuming a rigid tower foundation.

Accurate Wind Turbine Aeroelastic Models for Estimation and Control

Embodying modeling techniques include an approach different from conventional models to implement more rigorous mechanical equations to represent the dynamic interaction among multiple bodies, including flexible representation of the blades, tower and main shaft. Embodying models also can include accurate aerodynamic equations that include representations of induced velocities, and fluid/structure interaction.

Embodying algorithms that provide these solutions to these mechanical and aerodynamic equations can produce rigorous and accurate results in real-time (i.e., during operational control of the wind turbine) while executing on the limited computational power available at the wind turbine platform.

Figure 1:
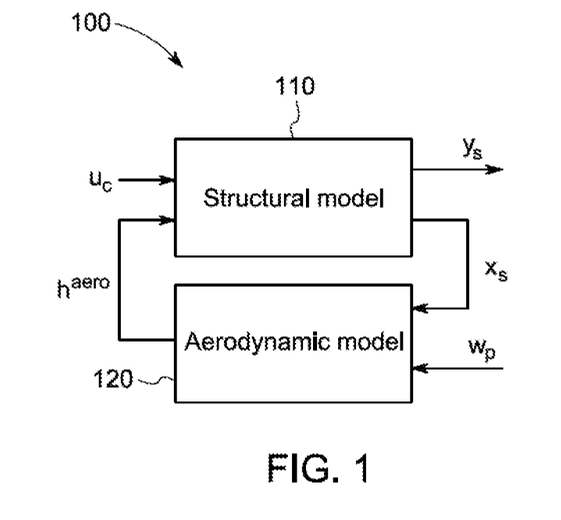
FIG. 1 schematically depicts an aeroelastic model structure in accordance with embodiments.

FIG. 1 schematically depicts an aeroelastic model structure 100 in accordance with embodiments. To manage the complexity of the overall aeroelastic model 100, it is convenient to partition it into a structural component model 110 and an aerodynamic (fluid) component model 120. The structural component 110 addresses the dynamics of the rigid and flexible bodies; and the fluid component 120 addresses the behavior associated with aerodynamic forces (and hydrodynamic forces for off-shore wind applications). The following discussion is directed towards only the aerodynamic fluid force at the interface between the structural and aerodynamic component models. However, a person of ordinary skill in the art can readily incorporate hydrodynamic forces for off-shore wind applications.

Structural Model

Conventional wind turbine structural models are formulated analytically as a multi-body system with flexible components which can be expressed mathematically by Lagrange, D'Alembert, or Newton-Euler approaches. Applying this conventional methodology to a Lagrangean formulation of a wind turbine system, the Lagrangean function L is computed as the difference between the kinetic energy ($T_{turbine}$) and potential energy ($V_{turbine}$)

$$L = T_{turbine} - V_{turbine}$$

Where the kinetic and potential energies are computed as the summation of the contributions of each component. This is expressed mathematically as $$T_{turbine} = T_{foundation} + T_{tower} + T_{nacelle} + T_{drivetrain} + T_{blades}$$

$$V_{turbine} = V_{foundation} + V_{tower} + V_{nacelle} + V_{drivetrain} + V_{blades}$$

The wind turbine structural equations of motion can then be obtained from the standard Lagrangean formulation $$\frac{d}{dt}\left(\frac{\partial L}{\partial \dot{q}}\right) - \frac{\partial L}{\partial q} = Q \tag{9}$$

Where q are the generalized coordinates of the system, Q are the generalized forces and the notation $$\frac{\partial}{\partial v}$$

indicates a partial derivative with respect to variable v, and $$\frac{d}{dt}$$

indicates the derivative with respect to time. Standard mathematical manipulations are applied on (9) to obtain the structural equations of the form $$M(q)\ddot{q} = h(q,\dot{q},u) \tag{10}$$

$$y_s = g_s(q,\dot{q},u) \tag{11}$$

Where u are the control inputs (e.g., blade pitch angle, generator torque); M is the mass matrix; and the vector h represents the generalized forces from different sources ($h = h^{inertia} + h^{gravity} + h^{aero} + h^{applied}$), including inertial forces, gravitational, aerodynamic forces as well as applied forces like electrical torque at the main shaft and torque at the blade pitch motors.

The vector $y_s$ contains outputs from the structural model that are useful for control or estimation applications. For example, for estimation applications, $y_s$ includes the simulated sensor measurements; for control applications, $y_s$ typically includes signals that can be used to evaluate feedback action—e.g., thrust, tower and blade moments. The concatenation of the coordinates and its derivatives is usually adopted as the state vector of the structural system $$x_s = \begin{bmatrix} q \\ \dot{q} \end{bmatrix}.$$

These conventional formulations could be used to obtain a simulation environment for system and/or controller design, or load certification. However, these conventional simulation models cannot be effectively implemented to operate in real time.

Embodying systems and methods take advantage of the described systematic method to obtain equations of motion for a wind turbine system to further advance the model definition to include the capability to generate model Jacobians analytically to enable implementation in an online, real-time process (i.e., during operational control of the wind turbine).

Aerodynamic Model

Aerodynamic forces can be obtained from a Blade Element Momentum (BEM) model to evaluate the induced velocity field around the wind turbine and the local aerodynamic forces at each blade. Blades are partitioned into a finite number of elements and the lift, drag, and aerodynamic moment are then computed at each element based on the local wind velocity, the blade element's local displacement and velocity, and airfoil characteristics.

In order to have a more accurate physical representation, BEM equations can be modified to consider the effect of blade tip and blade root losses—for example, by using Prandtl-Glauert correction factors.

The BEM model can be combined with wake models that describe the dynamics of the inflow wind field by means of induced velocities. Dynamic inflow models can be used to capture the time constants of the induced velocities to adapt to new operating conditions. If the dynamic effects of the wake are ignored, for example using static or steady state wake models where it can be assumed that the induced velocities achieve instantaneous equilibrium with aerodynamic forces, the corresponding model-based controllers can have an inadequate representation of the fluid-structure interaction and possibly lead to instabilities. The complete aerodynamic model combining BEM-like models with dynamic wake models can be written in the form:

$$\dot{x}_a = f(x_a, z_a, x_s, w_p) \quad (12)$$

$$h^{aero} = g(x_a, z_a, x_s, w_p) \quad (13)$$

$$0 = g^{alg}(x_a, z_a, x_s, w_p) \quad (14)$$

Where $x_a$ is the aerodynamic state vector which can contain induced axial and tangential velocities; $z_a$ is the vector of aerodynamic algebraic equations; $w_p$ is the vector of deterministic wind parameters, possibly including mean wind speed, misalignment, shear, veer and harmonic variations around the azimuth angle; $x_s$ is the state of the structural component; $h^{aero}$ represents the generalized aerodynamic forces and moments for the blades (typically 3 blades); and function $g^{alg}$ represents explicit algebraic constraints of the aerodynamic magnitudes. Alternative forms can be represented without algebraic constraints having them implicitly defined within the functions $f$ and $g$. The formulation usually comes as a computer program and not as set of closed form expressions (12-14).

The coupling between the aerodynamic and structural models is implemented through the structural state $x_s$, which is an input to the aerodynamic model, and the generalized aerodynamic force $h^{aero}$ which is an input to the structural model.

If the wind turbine makes use of remote wind sensors (e.g., LIDAR, SODAR, RADAR) to measure upstream or downstream wind speed components, the aerodynamic model can include an expanded representation of the wind to capture the inflow and wake velocities in front and/or behind the turbine, not just at the rotor face. In order to obtain a consistent aerodynamic model for estimation applications, some embodiments define a 3-dimensional grid that includes the rotor face and the remote wind measurement locations and augments the aerodynamic model in (12-14) to include the wind velocities at these points as part of the aerodynamic states $x_a$, and the propagation of the wind velocities along the mean wind speed direction as part of the dynamic equation (12).

During wind turbine operation, the aerodynamic, weight and inertial forces on the blade cause a flexible torsion of the blade that tends to reduce the aerodynamic performance and the structural loads. The effect of the blade torsion or flexible twist is typically modeled by either including blade torsional degrees of freedom in the dynamic equations or adopting a quasi-static approach and computing the steady state deformation of the blade sections that will be in equilibrium with the blade forces at every time instant. Because the addition of the torsional degrees of freedom into the dynamic equations make the model computationally expensive and the fact that typically the torsional degrees of freedom have natural frequencies that fall outside the control bandwidth, it is usually convenient to adopt the quasi-static modeling approach. In this case, the calculation of the quasi-static blade twist based on blade forces and blade stiffness can be added to the equations (12-14) by including the blade twist deformations as part of the algebraic variables $z_a$ and including the quasi-static torsional equilibrium equations as part of equation (14).

The aerodynamic forces are also dependent on the wind parameters $w_p$. In general, these parameters are not measured accurately by standard production sensors used in wind turbine systems. Therefore, for online, real-time (i.e., during operational control of the wind turbine) estimation and control applications, these parameters are estimated by augmenting the interconnected wind turbine structural (9-10) and aerodynamic (12-14) models with a wind disturbance model of the form $$\dot{x}_w = f_w(x_w, w_w) \quad (15)$$

$$w_p = g_w(x_w) \quad (16)$$

Where $x_w$ is the wind state vector, $w_w$ is a white noise stochastic process, and $f_w$ and $g_w$ are nonlinear functions. In embodying systems, the wind parameters $w_p$ could include mean wind speed, misalignment, shear, veer and harmonic variations around the azimuth angle. In other embodying systems, the wind parameters $w_p$ could include the effective wind speed per blade where the wind states $x_w$ represent the harmonic variation (i.e., 1P, 2P, 3P, etc., where XP denotes a multiple of the rotor rotational frequency) of the wind around the azimuth angle.

Model Derivatives

The application of advanced control and estimation algorithms typically requires mathematical models of the controlled system that are given in terms of Jacobians, or partial derivatives of the equations with respect to their inputs. Both the structural equations, the aerodynamic equations and the interconnection between the structural and aerodynamic equations of the wind turbine are differential-algebraic equations of the form $$\dot{x} = f(x, z, u) \quad (17)$$

$$0 = h(x, z, u) \quad (18)$$

$$y = g(x, z, u) \quad (19)$$

Where x is the state vector;
z is the vector of algebraic variables; and
y is the output vector. The approximate linearized representation around the operating point $(x^*, z^*, u^*)$ has the form $$\dot{x} = f(x^*, z^*, u^*) + \nabla f_x(x^*, z^*, u^*)(x - x^*) + \nabla f_z(x^*, z^*, u^*)(z - z^*) + \nabla f_u(x^*, z^*, u^*)(u - u^*)$$

$$0 = h(x^*, z^*, u^*) + \nabla h_x(x^*, z^*, u^*)(x - x^*) + \nabla h_z(x^*, z^*, u^*)(z - z^*) + \nabla f_u(x^*, z^*, u^*)(u - u^*)$$

$$y = g(x^*, z^*, u^*) + \nabla g_x(x^*, z^*, u^*)(x - x^*) + \nabla g_z(x^*, z^*, u^*)(z - z^*) + \nabla g_u(x^*, z^*, u^*)(u - u^*)$$

Where the Jacobian matrices are the gradients of functions $f$, $g$ and $h$ in the direction of the vectors x, z and u. To simplify notation, by assuming that there are no algebraic constraints, the following definitions can be used:

$$A = \nabla f_x(x^*, z^*, u^*) \quad (20)$$

$$B = \nabla f_u(x^*, z^*, u^*) \quad (21)$$

$$F = f_x(x^*, z^*, u^*) - Ax^* - Bu^* \quad (22)$$

$$C = \nabla g_x(x^*, z^*, u^*) \quad (23)$$

$$D = \nabla g_u(x^*, z^*, u^*) \quad (24)$$

$$G = g_x(x^*, z^*, u^*) - Cx^* - Du^* \quad (25)$$

to arrive at the simplified form of the approximate local model around $(x^*, z^*, u^*)$ $$\dot{x} = Ax + Bu + F \quad (26)$$

$$y = Cx + Du + G \quad (27)$$

The control model data A, B, C, D, F, G varies with the operating point and needs to be evaluated on a regular basis during the control operation.

When the system under consideration is highly nonlinear and the operating space spans a wide range in the domain of the variables x, z, u, the Jacobians need to be evaluated at every time step and the ability to compute fast Jacobians can become critical to enable advanced control applications. This is the case for wind power generation systems, where the transient operation can be subject to strong wind variations, characterized by flexible structures, and nonlinear kinematics, thus requiring regular model data re-calculation.

Online implementation of estimation and control algorithms are sometimes expressed as a function of the discrete time representation of the linearized model equations. Therefore, instead of (EQS. 26-27), a discrete time equivalent could be employed using the discrete-time version of the Jacobians. For purposes of the following discussion, the following formulations do not make a distinction between continuous-time or discrete-time linearization.

Figure 2:
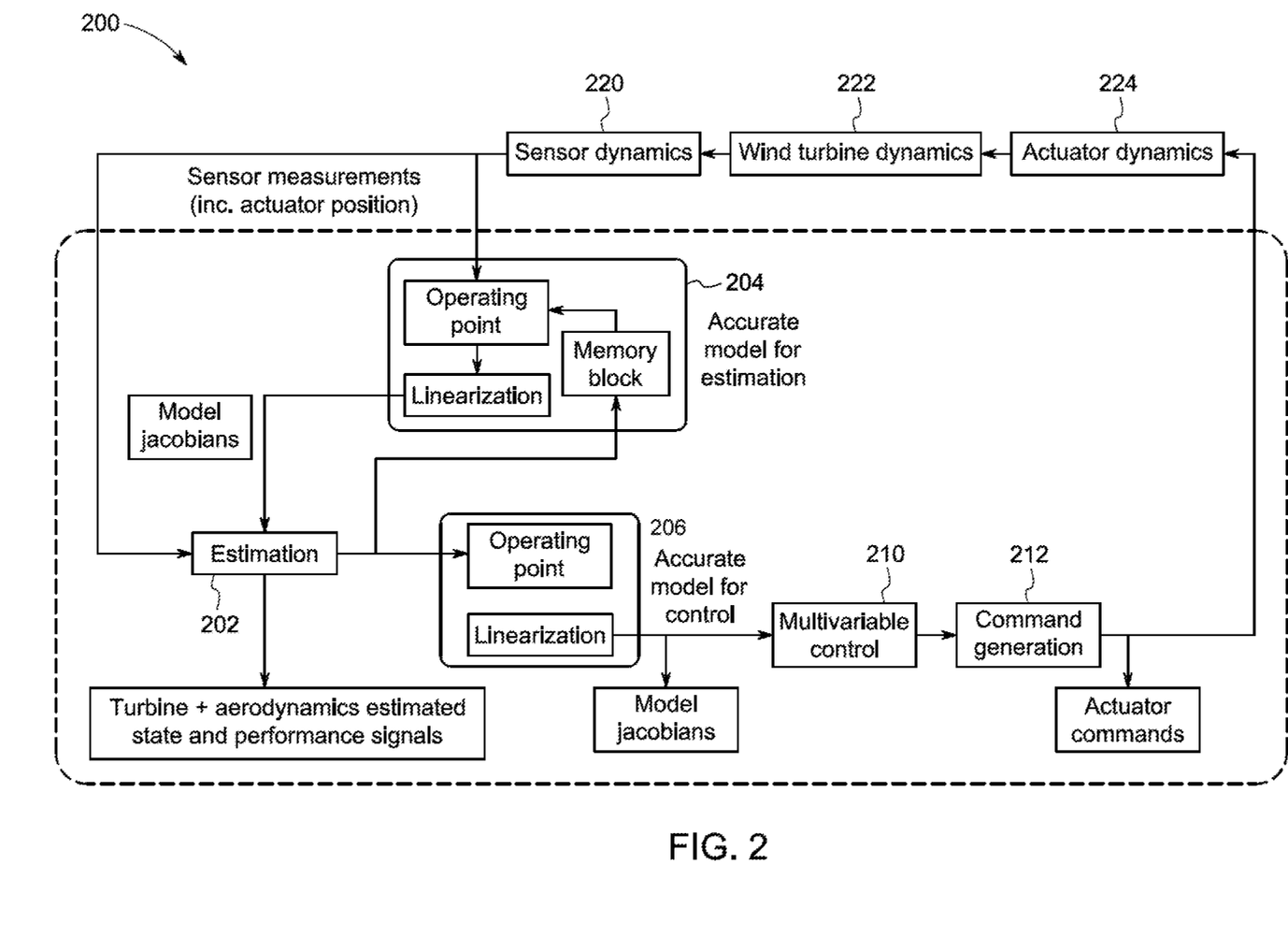
FIG. 2 depicts a process for computing control signals for dynamic operation of a wind turbine in accordance with embodiments.

In applications based on data from a single time step, the linearization module of the control model 206 produces a set of Jacobian matrices A, B, C, D and associated linearization errors F and G. For applications such as MHE and MPC, the linearization module produces a sequence of Jacobian matrices corresponding to each step in a pre-specified time horizon.

The model data represented by A, B, C, D, F, G varies with the operating point. Embodying systems and methods can evaluate these model elements on a regular basis during the control operation—e.g., at predetermined, periodic or specified, time intervals. When the system under consideration is highly nonlinear and the operating space spans a wide range in the domain of the variables x, z, u, embodiments can evaluate the Jacobians at about every time step and the ability to compute fast Jacobians can becomes critical to enable advanced control applications. This is the case for wind power generation systems, where the transient operation subject to strong wing variations and characterized by flexible structures and nonlinear kinematics requires regular model data recalculation.

Computing Model Derivatives

Derivatives Obtained Through Numerical Differentiation

Conventional approaches to obtain function derivatives include numeric and exact differentiation. Numeric differentiation techniques approximate derivatives by means of numeric finite difference schemes. For example, for models (EQS. 10), numerical derivatives are typically obtained through central difference calculations of the form:

$$\frac{dh_i}{dq_j}(q^*, \dot{q}^*, u^*) \approx \frac{h_i(q^* + \delta e_j, \dot{q}^*, u^*) - h_i(q^* - \delta e_j, \dot{q}^*, u^*)}{2\delta}$$

$$\frac{dh_i}{d\dot{q}_j}(q^*, \dot{q}^*, u^*) \approx \frac{h_i(q^*, \dot{q}^* + \delta e_j, u^*) - h_i(q^*, \dot{q}^* - \delta e_j, u^*)}{2\delta}$$

$$\frac{dh_i}{du_j}(q^*, \dot{q}^*, u^*) \approx \frac{h_i(q^*, \dot{q}^*, u^* + \delta e_j) - h_i(q^*, \dot{q}^*, u^* - \delta e_j)}{2\delta}$$

where $\delta$ is a perturbation size; and $e_j$ is the j-th canonical vector.

This conventional method is rarely efficient online for real time control/optimization applications due to the computational effort and numerical inaccuracies caused by round-off errors, ill conditioning, and numeric instabilities. Other methods are used instead, as described in the following paragraphs.

Exact Derivatives Obtained Through Analytic Differentiation

Alternate conventional approaches encompass exact or analytic differentiation calculation of derivatives using either manual derivation, algorithmic differentiation, or symbolic differentiation. Manually evaluating derivatives is usually very tedious and error prone, with applicability only when the underlying system model is very simple.

Algorithmic differentiation is a process by which a mathematical program to evaluate a function is processed to create another program to compute derivatives of the original function. Conventional tools exist that can execute this evaluation process automatically (without user intervention) by converting the original algorithms into a graphical representation, symbolically manipulating the function's graph to generate a graph for the differentiation by systematically applying the chain rule for differentiation, and finally obtaining a new algorithm to evaluate the corresponding derivatives.

Symbolic differentiation relies on a computer algebra system that operates on algebraic expressions to produce a set of associated algebraic expressions to evaluate the derivatives of the original expressions. Tools for implementing symbolic differentiation typically include a collection of techniques to simplify algebraic expressions and can convert the resulting expressions into code. While effective to handle closed form expressions, symbolic differentiation cannot easily handle functions containing algorithmic control flow features—e.g., "for" or "while" loops, and "if-then" branching.

Both symbolic and algorithmic differentiation produce "exact" derivatives, unlike the numerical differentiation approach, that are not affected by round-off and truncation problems. The selection of an approach to obtain analytic derivatives depends on the original equations/programs undergoing differentiation. Symbolic tools are often good for simplifying algebraic expression, while algorithmic tools can produce efficient code and deal efficiently with logic branches and control loops.

In some wind power generation platforms, computational processing capability of the processor is insufficient to achieve the real time implementation of exact derivatives. In accordance with embodiments, on these platforms approximate derivatives can be implemented as lookup tables. In this method, the derivatives are evaluated in a grid of the input space and the derivatives are approximated through an interpolation approach. The calculation of derivatives is performed off-line, and the on-line computation performs the interpolation. In accordance with embodiments, this separation between off-line and on-line computation allows numerical differentiation to be used in the off-line evaluation in case the exact derivative method is overly complex. Several numeric differentiation schemes can be used to approximate the system derivatives, including forward, backward and central differences.

Approximate Derivatives Obtained Through Surrogate Models

In the case that analytic differentiation produces high-complexity functions or expressions that are not suitable for implementation in the target control platform, it is convenient to approximate the original function with a surrogate function for which analytic differentiation is simpler. The approximating can be performed by using neural networks (NN) to obtain surrogate models of the original function and leverage this model to easily construct the analytic derivative. In some implementations, the neural network can use a sigmoid activation function.

For example, if a function f(x) that maps a vector of size n into the set of real numbers is approximated by the following feed-forward neural network with a single hidden layer:

$$f(x) \cong w^{[2]T}\sigma(W^{[1]T}x+b^{[1]})$$

Where $$\sigma(z) = \begin{bmatrix} \sigma(z_1) \\ \vdots \\ \sigma(z_m) \end{bmatrix} \text{ with } \sigma(z_k) = \frac{1}{1+e^{-z_k}}$$

for all "k" from 1 to m, $W^{[1]}$ is a matrix with n rows and m columns, $w^{[2]}$ and $b^{[1]}$ are vectors of size m, then the derivatives of "f(x)" can be approximated by the following expression:

$$\begin{bmatrix} \frac{df}{dx_1} \\ \vdots \\ \frac{df}{dx_n} \end{bmatrix} \cong w^{[2]T} W^{[1]T} \sigma'(W^{[1]T}x + b^{[1]})$$

Where $$\sigma'(z) = \begin{bmatrix} \sigma'(z_1) \\ \vdots \\ \sigma'(z_m) \end{bmatrix}$$

and $\sigma'(z_k)=\sigma(z_k)(1-\sigma(z_k))$ for all k from 1 to m. The evaluation of the approximate Jacobian off involves just three vector-matrix multiplications and the evaluation of the sigmoid function at x. The computation cost of this type of approximations can be very convenient if the function f is complex and the number of neurons m in the hidden layer are moderate.

Platform Computational Environment for Wind Turbines

The implementation of embodying systems and methods can vary dependent on the computational capability available from the platform's control processor environment and on the required accuracy of the application. Each embodiment can provide predictive data for use by the control processor in evaluating the commands needed for real time operational control of the wind turbine under current operating parameters and conditions.

Embodying models can resolve sensor data from the wind turbine to obtain aerodynamic state $x_a$ that includes the axial and tangential induced velocities at each blade section and each blade. Structural state $x_s$ includes a representation of the blade flap- and edge-wise displacements. The output force vector $h_a$ includes forces and moments applied from each blade to the hub.

The wind parameters $w_p$ are a representation of the wind field approaching the wind turbine rotor. Wind parameters $w_p$ includes wind components that characterize the temporal/spatial variability of the wind, e.g., mean wind speed, wind shear, wind direction and eddy structures.

Derivatives calculations of the coupled aeroelastic models can be done operating on the coupled form (17)-(19), or by evaluating the separately the derivatives of the structural model and the aerodynamic model and then integrating the coupled derivatives applying standard manipulation of linear systems.

The online computation of the derivatives of structural wind turbine models, like for example represented by equations (9)-(10), is most conveniently done using exact derivatives, either using algorithmic or symbolic differentiation. The following sections focus mostly on the calculation of the derivatives of the aerodynamic model.

Low CPU Capability Platform

For severely limited CPU capacity, the aerodynamic representation of embodying models can be a quasi-static implementation achieved via table interpolation, where the generalized operational forces are tabulated in a grid of operating parameters for a chosen reference structural state $x_s^{ref}$. In accordance with embodiments, formulation for this low CPU capability is obtained from finding steady state solutions—i.e., for a chosen reference structural state $x_s^{ref}$, a steady state value can be found for the aerodynamic states $x_a$ and algebraic variables $z_a$. The resulting forces per blade can be tabulated as a function of a minimal set of parameters to obtain a representation of the form:

$$h_i^{aero} = h_i^a(\lambda_i, \theta_i, \varphi_i; x_s^{ref}) \tag{28}$$

Where $$\lambda_i = \frac{\omega R}{V_i}$$

is the i-th blade tip to wind speed ratio; $V_i$ is the effective wind speed for the i-th blade; $\theta_i$ is the i-th blade pitch angle; and $\varphi_i$ is the azimuth angle of the i-th blade.

In accordance with an embodiment, an off-line process can perform a computational procedure to evaluate both the aerodynamic forces $h_a$ and their (numerical) derivatives at each grid point (denoted by i, j, k for the various operating parameters $\lambda$, $\theta$, $\varphi$):

$$\left.\frac{dh^{aero}}{d\lambda}\right|_{ijk} = \frac{h^a(\lambda_i+\delta, \theta_j, \varphi_k; x_s^{ref}) - h^a(\lambda_i-\delta, \theta_j, \varphi_k; x_s^{ref})}{2\delta} \tag{29A}$$

$$\left.\frac{dh^{aero}}{d\theta}\right|_{ijk} = \frac{h^a(\lambda_i, \theta_j+\delta, \varphi_k; x_s^{ref}) - h^a(\lambda_i, \theta_j-\delta, \varphi_k; x_s^{ref})}{2\delta} \tag{29B}$$

$$\left.\frac{dh^{aero}}{d\varphi}\right|_{ijk} = \frac{h^a(\lambda_i, \theta_j, \varphi_k+\delta; x_s^{ref}) - h^a(\lambda_i, \theta_j, \varphi_k-\delta; x_s^{ref})}{2\delta} \tag{29C}$$

$$\left.\frac{dh^{aero}}{dx_s}\right|_{ijk} = \frac{h^a(\lambda_i, \theta_j, \varphi_k; x_s^{ref}+\delta) - h^a(\lambda_i, \theta_j-\delta, \varphi_k; x_s^{ref}-\delta)}{2\delta} \tag{29D}$$

The data obtained through (29A-D) can be used to construct a tabulated representation of for the derivatives of the form:

$$\left.\frac{dh^{aero}}{d\lambda}\right|_{blade\,i} = h_{\lambda i}^a(\lambda_i, \theta_i, \varphi_i; x_s^{ref}) \tag{30A}$$

$$\left.\frac{dh^{aero}}{d\theta}\right|_{blade\,i} = h_{\theta i}^a(\lambda_i, \theta_i, \varphi_i; x_s^{ref}) \tag{30B}$$

$$\left.\frac{dh^{aero}}{d\varphi}\right|_{blade\,i} = h_{\varphi i}^a(\lambda_i, \theta_i, \varphi_i; x_s^{ref}) \tag{30C}$$

$$\left.\frac{dh^{aero}}{dxs}\right|_{blade\,i} = h_{xs\,i}^a(\lambda_i, \theta_i, \varphi_i; x_s^{ref}) \tag{30D}$$

If the blade twist effects are to be considered, then the blade tip to wind speed ratio, azimuth and pitch angles are not enough to uniquely characterize blade twist, in which case the tables (28, 29A-D) need to be augmented to more precisely characterize the aerodynamic operating point. For this reason, the aerodynamic tables can be augmented to include a dynamic pressure parameter for blade i:

$$\frac{1}{2}\rho V_i^2,$$

or any other parameter mat can be used to uniquely characterize the aerodynamic operating point, the aerodynamic forces and hence, the quasi-static blade twist.

High CPU Capability

For high CPU capability where the platform can afford greater accuracy control models, the formulation of a BEM model with wake dynamics can be implemented in different ways. In accordance with embodiments, the aerodynamic states $x_a$ can include the wind axial induced velocity and the wind tangential induced velocity. The algebraic variables could include for example a tip loss factor. Wind parameters for embodying approaches can include the mean wind speed, vertical and horizontal shear coefficients, vertical and horizontal misalignment angles, and rotor azimuth angle dependent harmonic wind variation. The derivatives of these control models are obtained by applying automatic differentiation or symbolic differentiation to the equations (12, 13, 14, 15, 16).

Intermediate CPU Capability

For intermediate CPU capabilities, different simplifications can be implemented using different strategies. For example, in accordance with embodiments, strategies can include using a quasi-steady induced velocity, reducing the number of sections to represent local aerodynamic forces, reducing the number of wind parameters, and combining computation programs with lookup tables. The approximation of the aerodynamic model with surrogate models can be done for high fidelity models and/or static approximations. An approximate real time aerodynamic model can be obtained with a neural network for each entry of the aerodynamic force vector component $h^{aero}$.

This process of mapping a neural network to each force vector component can be done by defining the number of neurons in the hidden layer(s), evaluating the current real time model to compute the aerodynamic forces for a given coverage of the input space, and then training the neural network by defining the optimal values of the weights through a back-propagation algorithm.

FIG. 2 depicts process 200 for estimating control signals for dynamic operation of a wind turbine in accordance with embodiments. Estimation module 202 receives data from estimation model 204. Multivariable control module 210 receives data from control model 206, which can be another instance of the first model. In some implementations, the same instance of the model can be used for estimation and control modeling.

The model performs online calculations classified as operating point calculation and linearization calculations. Estimation model 204 receives monitored sensor data from a sensor suite monitoring the wind turbine. This sensor data can include sensor dynamic data 220, wind turbine dynamic data 222, and actuator dynamic data 224. The sensor data can be updated at predetermined intervals so that generated control commands are responsive to changes in the monitored sensor data. Prior estimation results stored in a memory block can be used as feedback into the operating point calculation.

By applying the monitored data in the model, the operating point can be defined by the prevailing wind speed as well as other wind and environmental parameters that can include misalignment and shear. The operating point can also be defined by structural conditions of the wind turbine including a reference blade pitch for each blade, reference structural deformation in flexible components, and the azimuth rotation angle and rate. This operating point is used as the starting point for the linearization. The linearization module evaluates the Jacobians for structural and aerodynamic components, and then combines them into a unified set of Jacobians for the whole model.

Estimation module receives the linearized model Jacobians from the estimation model, and the monitored sensor data provided to the estimation model. The estimation module generates turbine and aerodynamic estimated state and performance signals. These signals are provided to a memory block for access by estimation model 204. The turbine and aerodynamic estimated state and performance signals are also provided by the estimation module to control model 206.

The control model 206 can obtain estimates of the turbine and aerodynamic operating points by applying in real time (i.e., at about the time these operating points are influencing the operation of the wind turbine) estimation and/or control applications to the estimated state and performance signals generated by the estimation module.

The estimation and control applications can be classified into applications which use a single time step or multiple time steps. The former group can include estimation applications such as Kalman Filters and Extended Kalman Filters (EKF); and can include control applications such as Linear Quadratic Regulator (LQR), Linear Quadratic Gaussian (LQG), state-dependent Riccati equations and controllers obtained as a solution of a Linear Matrix Inequality (LMI) problem. The latter group can include moving horizon estimation (MHE) and model predictive control (MPC) applications.

The real-time estimates of the turbine and aerodynamic operating points from the control module 206 are provided to the multivariable control module 210. The multivariable control module generates control conditions based on the turbine and aerodynamic operating points and the real time operating parameters as monitored by the sensors. The control conditions are provided to command generation module 212, which generates actuator commands that direct a control processor to control wind turbine operation. The wind turbine operating parameters and conditions are monitored and provided in a loop back to the estimation module 202 and estimation model 204. The monitoring can be performed at predetermined intervals or about continuously (within the response and sampling rates of the sensor suite).

Figure 3:
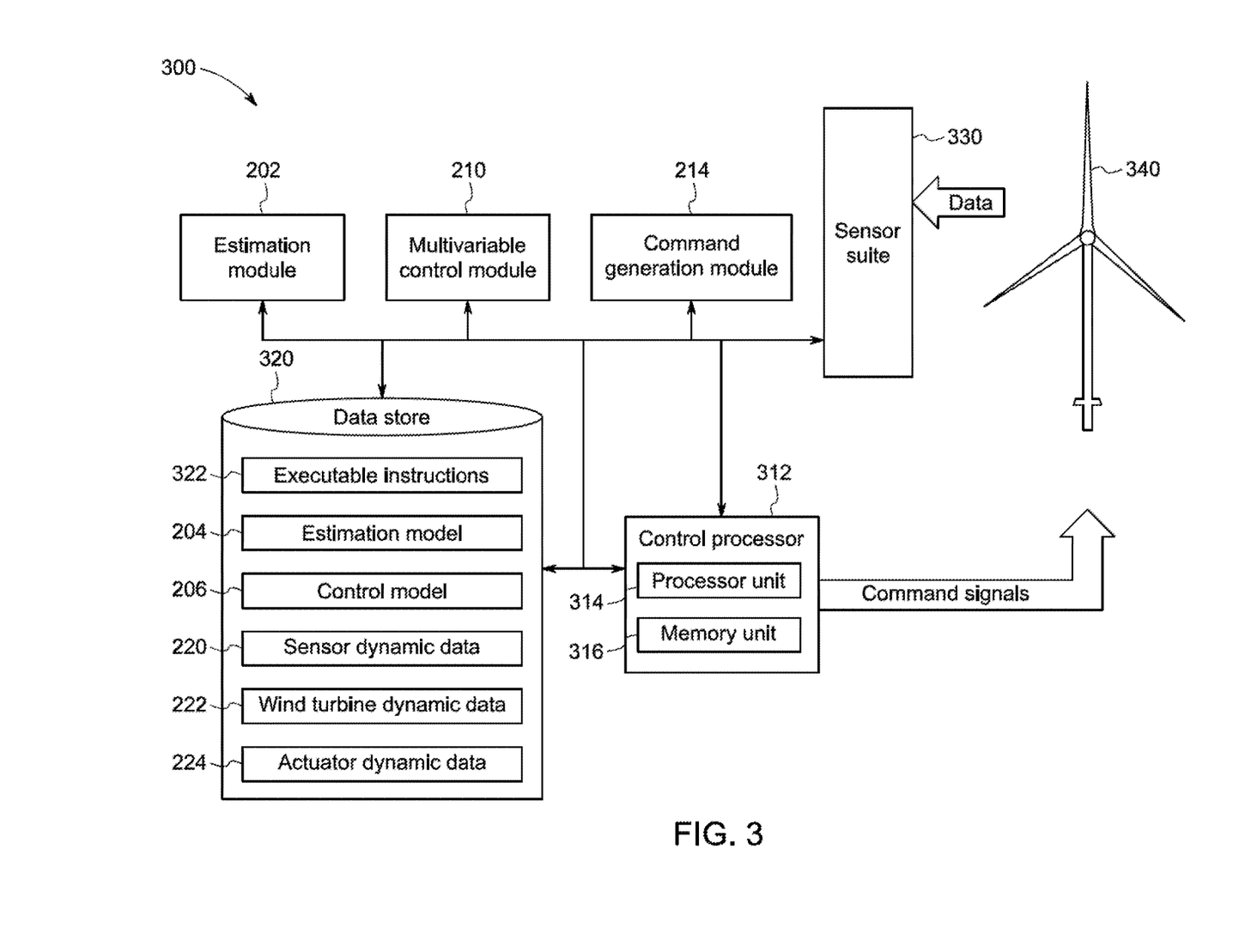
FIG. 3 depicts a system for computing control signals for dynamic operation of a wind turbine in accordance with embodiments.

FIG. 3 depicts system 300 for estimating control signals for dynamic operation of a wind turbine in accordance with embodiments. System 300 can include control processor 312 in communication with data store 320. The control processor can be in direct communication with the data store, or in indirect communication across an electronic communication network (not shown). Processor unit 314 can execute executable instructions 322, which cause the processor to perform a process for estimating control signals. Memory unit 316 can provide the control processor with local cache memory. Data store 320 can include estimation model 204, control model 206, sensor dynamic data 220, wind turbine dynamic data 222, and actuator dynamic data 224. Sensor suite 330 can include sensors positioned in relation to wind turbine 340 at locations to obtain respective dynamic data.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of estimating control signals for dynamic operation of a wind turbine, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A wind turbine system, comprising:
   a sensor suite comprising a plurality of sensors positioned to monitor wind turbine operational parameters and environmental conditions of the wind turbine system, the sensor suite in communication with a data store and configured to provide sensor dynamic data to the data store;
   a control processor in communication with the data store, the control processor comprising a processor unit;
   a control model configured to perform a linearization evaluation at a turbine operating point, the linearization evaluation being performed on a model generated by applying an analytic differentiation technique on a surrogate model to obtain at least one of a structural component dynamic behavior, a fluid component dynamic behavior, and a combined structural and fluid component dynamic behavior of wind turbine operation, the analytic differentiation technique being one of algorithmic differentiation or symbolic differentiation;
   the control model comprising a coupling between the structural component dynamic behavior and the fluid component dynamic behavior, the coupling implemented by introduction of a generalized fluid force in a structural model of the wind turbine system and comprising in the fluid component dynamic behavior a dependence of the generalized fluid force on a structural state of the wind turbine system, the structural model comprising structural features accurate to at least one of a first bending natural mode of a tower of the wind turbine system, a first bending natural mode of one or more rotor blades of the wind turbine system, and a rotation of the drive-train of the wind turbine system; and
   a module configured to perform a calculation utilizing at least one of the linearization evaluation of the structural component dynamic behavior, the fluid component dynamic behavior, and the combined structural and fluid component dynamic behavior.

2. The system of claim 1, comprising:
   the module is an estimation module configured to generate one or more estimates selected from a group that includes a turbine state signal estimate, a turbine performance signal estimate, a fluid state signal estimate, and a fluid performance signal estimate; and
   each of the one or more estimates based on the one or more elements of sensor dynamic data, the structural component dynamic behavior, and the fluid component dynamic behavior.

3. The system of claim 2, the estimation module configured to generate the one or more estimates by implementing an extended Kalman filter.

4. The system of claim 2, wherein an interconnected structural component dynamic behavior model and the fluid component dynamic behavior model are augmented with a wind disturbance dynamic behavior model to estimate the wind parameters, the wind parameters including one or more of mean wind speed, misalignment, shear, veer, harmonic variations, and an effective wind speed per blade represented as a harmonic variation of wind.

5. The system of claim 1, wherein at least a portion of the fluid component dynamic behavior included in a lookup table contains representations of one or more rotor plane fluidic properties and their derivatives, the rotor plane traversed by at least one of the one or more blades.

6. The system of claim 5, the lookup table comprising:
   respective elements containing a data set for a respective one of the one or more blades, each data set including a dependence on at least one of one or more of a blade tip-to-wind speed ratio, a pitch angle, an azimuth angle, and a representative dynamic pressure parameter; and
   wherein the data set can be applied to determine at least one of blade forces and blade twist.

7. The system of claim 1, wherein the structural model comprises a blade twist effect resulting from one or more of a fluid, inertial, and mass blade force.

8. The system of claim 1, comprising:
   the module is a multivariable control module configured to determine actuator commands based on the one or more control states; and
   the actuator commands including wind turbine commands to maintain operation of the wind turbine at the predetermined setting in about real time.

9. The system of claim 8, the multivariable control module including a model predictive controller.

10. The system of claim 1, wherein the fluid component dynamic behavior comprises:
    a contribution of local forces applied to blade segments based on local aerodynamic properties of airfoils augmented to apply corrections for three-dimensional effects; and
    a dynamic wake effect from wind turbine operation.

11. The system of claim 1, wherein the fluid component dynamic behavior comprises data from a remote wind measurement system sensor and at least one of a model of wind propagation upstream to a rotor face and a model of wind propagation downstream of a rotor face.

12. The system of claim 1, wherein the control model is configured to obtain an analytical representation of the structural component dynamic behavior by a multi-body dynamic modeling technique.

13. The system of claim 1, wherein the control model is configured to obtain the fluid component dynamic behavior by implementing a Blade Element Momentum (BEM) model, the BEM model containing representations of one or more fluidic properties of a rotor plane, the rotor plane traversed by at least one of the one or more blades.

14. The system of claim 1, wherein the control model is configured to:
comprising a coupling for at least one of the structural component dynamic behavior and the fluid component dynamic behavior; and
construct an analytic derivative from the surrogate function.

15. A method of computing at least one of wind turbine estimated operational parameters and control commands, the method comprising:
a sensor suite monitoring wind turbine operational parameters and environmental conditions to obtain sensor dynamic data to the data store;
performing a linearization evaluation at a turbine operating point, the linearization evaluation being performed on a model generated by applying an analytic differentiation technique on a surrogate model to obtain at least one of a structural component dynamic behavior, a fluid component dynamic behavior, and a combined structural and fluid component dynamic behavior of wind turbine operation, the analytic differentiation technique being one of algorithmic differentiation or symbolic differentiation;
implementing a coupling between the structural component dynamic behavior and the fluid component dynamic behavior by introduction of a generalized fluid force in a structural model of the wind turbine and includes in the fluid component dynamic behavior a dependence of the generalized fluid force on a structural state of the wind turbine, the structural model including structural features accurate to at least one of a first bending natural mode of a tower, a first bending natural mode of one or more blades, and a rotation of the drive-train of the wind turbine; and
at least one of an estimation module and a multivariable control module performing a calculation utilizing at least one of the linearization evaluation of the structural component dynamic behavior, the fluid component dynamic behavior, and the combined structural and fluid component dynamic behavior.

16. The method of claim 15, comprising:
the estimation module generating one or more estimates selected from a group that includes a turbine state signal estimate, a turbine performance signal estimate, a fluid state signal estimate, and a fluid performance signal estimate; and
basing each of the one or more estimates on the one or more elements of sensor dynamic data, the structural component dynamic behavior, and the fluid component dynamic behavior.

17. The method of claim 15, comprising:
the multivariable control module determining actuator commands based on the one or more control states; and
the actuator commands including wind turbine commands to maintain operation of the wind turbine at the predetermined setting in about real time.

18. The method of claim 15, comprising augmenting an interconnected structural component dynamic behavior model and the fluid component dynamic behavior model with a wind disturbance dynamic behavior model to estimate the wind parameters, the wind parameters comprising one or more of mean wind speed, misalignment, shear, veer, harmonic variations, and an effective wind speed per blade represented as a harmonic variation of wind.

19. The method of claim 16, wherein the structural model contains a component representing a blade twist effect resulting from one or more of a fluid, an inertial, and a mass blade force.

20. The method of claim 15, comprising modeling the fluid component dynamic behavior to account for:
a contribution of local forces applied to blade segments based on local aerodynamic properties of airfoils augmented to apply corrections for three-dimensional effects; and
a dynamic wake effect from wind turbine operation.

21. The method of claim 15, wherein the fluid component dynamic behavior comprises data from a remote wind measurement system sensor and at least one of a model of wind propagation upstream to a rotor face and a model of wind propagation downstream of a rotor face.

22. The method of claim 15, comprising obtaining an analytical representation of the structural component dynamic behavior by implementing a multi-body dynamic modeling technique.

23. The method of claim 15, comprising implementing a Blade Element Momentum (BEM) model to obtain at least a portion of the fluid component dynamic behavior, the BEM model containing representations of one or more fluidic properties of a rotor plane, the rotor plane traversed by at least one of the one or more blades.

24. The method of claim 15, comprising:
approximating a respective surrogate function for at least one of the structural component dynamic behavior and the fluid component dynamic behavior using a neural network; and
constructing a respective analytic derivative from the respective surrogate function.

25. The method of claim 15, comprising in a lookup table at least a portion of the fluid component dynamic behavior, the lookup table containing representations of one or more rotor plane fluidic properties and their derivatives, the rotor plane traversed by at least one of the one or more blades.

* * * * *